(12) United States Patent
Susnjara

(10) Patent No.: US 9,605,705 B2
(45) Date of Patent: *Mar. 28, 2017

(54) STRUCTURE AND METHOD OF ASSEMBLY THEREOF

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,542

(22) Filed: Jun. 29, 2011

(65) Prior Publication Data

US 2011/0318527 A1    Dec. 29, 2011

Related U.S. Application Data

(62) Division of application No. 12/350,638, filed on Jan. 8, 2009, now Pat. No. 7,998,549.

(51) Int. Cl.
*F16B 12/12* (2006.01)
*A47B 47/04* (2006.01)
*A47B 67/04* (2006.01)

(52) U.S. Cl.
CPC .......... *F16B 12/125* (2013.01); *A47B 47/042* (2013.01); *A47B 67/04* (2013.01); *Y10T 29/49826* (2015.01); *Y10T 29/49833* (2015.01); *Y10T 29/49895* (2015.01); *Y10T 29/49899* (2015.01); *Y10T 29/49901* (2015.01); *Y10T 29/49995* (2015.01); *Y10T 428/24174* (2015.01)

(58) Field of Classification Search
CPC ..... F16B 12/125; A47B 47/042; A47B 67/04; Y10T 29/49826; Y10T 29/49899; Y10T 428/24174; Y10T 29/49833; Y10T 29/49995; Y10T 29/49901; Y10T 29/49895
USPC ..... 428/119; 700/159; 29/432, 432.1, 432.2, 29/464, 466, 467, 557, 728; 403/353, 403/381, 364
See application file for complete search history.

(56) References Cited

U.S. PATENT DOCUMENTS

| | | | | |
|---|---|---|---|---|
| 4,403,886 | A | * | 9/1983 | Haeusler ........................ 403/217 |
| 4,750,794 | A | * | 6/1988 | Vegh ............................. 312/263 |
| 5,724,246 | A | * | 3/1998 | Heil .............................. 700/167 |
| 5,730,544 | A | * | 3/1998 | Dils et al. ..................... 403/292 |

(Continued)

*Primary Examiner* — Nathan Van Sell
(74) *Attorney, Agent, or Firm* — Bookoff McAndrews, PLLC

(57) ABSTRACT

A method of forming an assembly including a first workpiece having a surface provided with a mortise and a second workpiece provided with a tenon inserted into the mortise joining the workpieces together in which the second workpiece is disposed in a certain orientation relative to the first workpiece to provide a certain disposition of the workpieces when joined together, generally consisting of providing identifying marks on the surface of the first workpiece and the tenon of the second workpiece at locations assuming a certain disposition when the second workpiece is disposed in a certain orientation and the tenon is registered with the mortise; positioning the second workpiece relative to the first workpiece wherein the second workpiece is disposed in the certain orientation relative to the first workpiece, the tenon is registered with the mortise and the marks are disposed in the certain mark disposition; and displacing the second workpiece toward the first workpiece and inserting the tenon into the mortise.

18 Claims, 2 Drawing Sheets

(56) References Cited

U.S. PATENT DOCUMENTS

| | | | |
|---|---|---|---|
| 6,681,140 B1* | 1/2004 | Heil | 700/95 |
| 7,992,358 B2* | 8/2011 | Olofsson et al. | 52/582.1 |
| 2002/0127051 A1* | 9/2002 | Olofsson | E04B 1/6125 403/268 |
| 2004/0027038 A1* | 2/2004 | Gaesser | B23D 47/04 312/294 |
| 2005/0240300 A1* | 10/2005 | Sigtryggsson | B27M 3/0093 700/171 |
| 2007/0240547 A1* | 10/2007 | Dick | B27M 1/08 83/76.1 |

\* cited by examiner

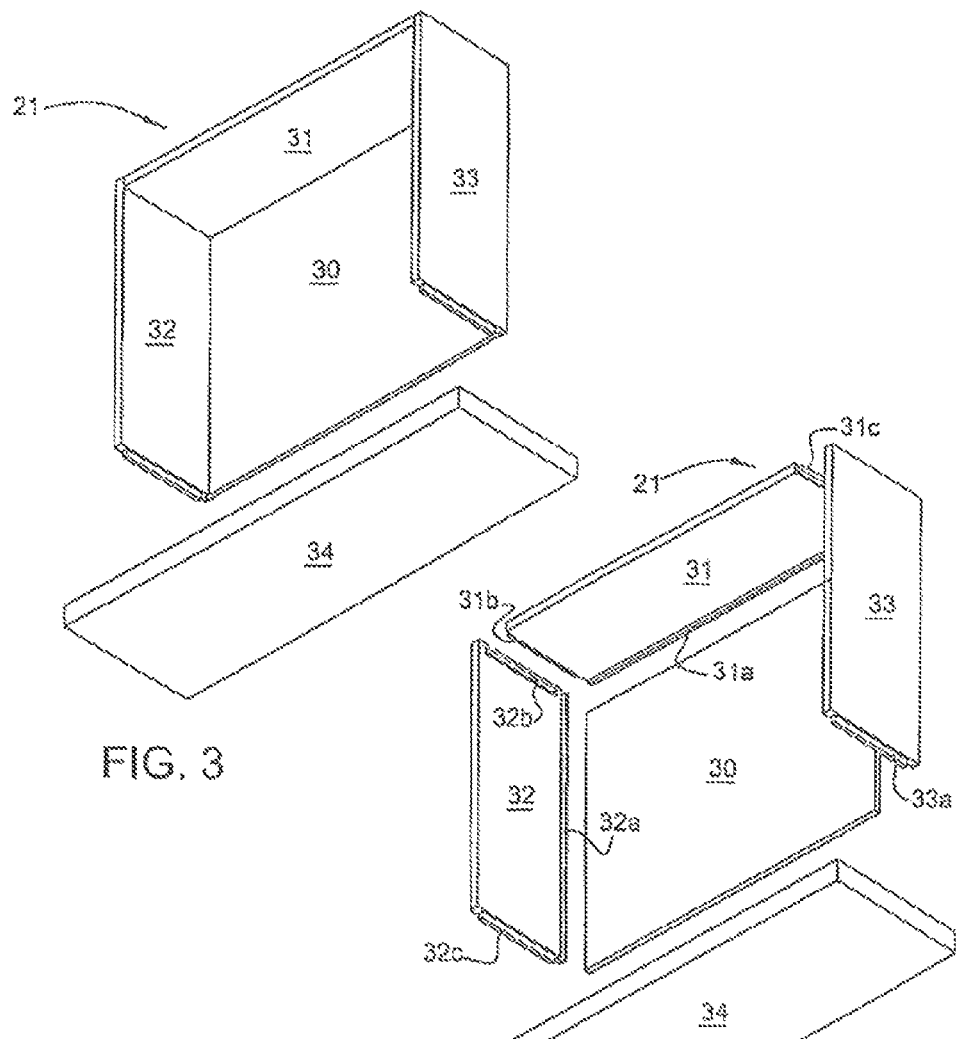
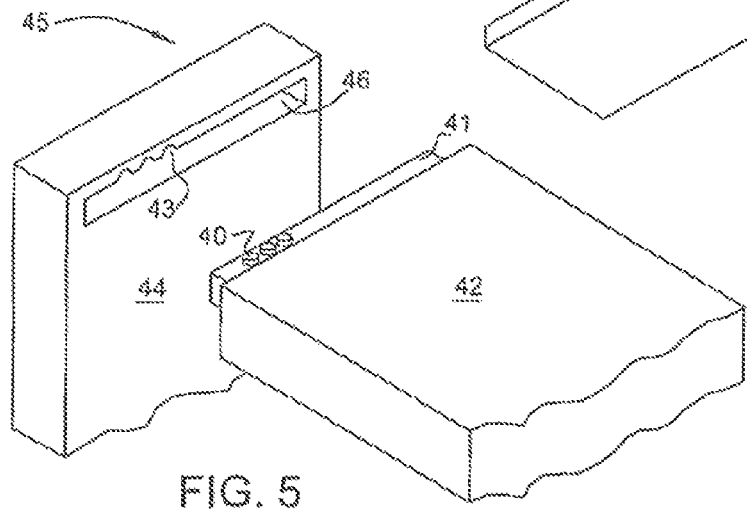

STRUCTURE AND METHOD OF ASSEMBLY THEREOF

This is a Divisional application of U.S. patent application Ser. No. 12/350,638 filed on Jan. 8, 2009. The entire disclosure of U.S. patent application Ser. No. 12/350,638 is hereby incorporated by reference.

This invention relates to a method of assembling a number of workpieces in forming a structure such as a cabinet, and a structure formed by such method.

BACKGROUND OF THE INVENTION

Kitchen cabinets are constructed primarily from wood-based sheet material such as plywood, medium density fiberboard, commonly referred to as MDF, particleboard or chip core. These sheet materials are generally comprised of sheets of sliced wood veneer laminated together or wood materials ground and then pressed into sheets of a consistent thickness. They are available in various widths and lengths with four foot by eight foot, four foot by ten foot, five foot by eight foot and five foot by ten foot being common standard sizes available in the United States from a variety of sources.

A common method of processing these sheets into cabinet components is to place the entire sheet of material on the worktable of a computer controlled machine called a CNC router, and then cut out the various parts from the sheet. Parts are commonly nested on the sheet to optimize material usage and minimize scrap. The CNC router cuts the parts and performs any required machining operations as directed by a computer program. This approach to manufacturing products from sheet material has become known as "Nested Based Manufacturing".

A design software program operating on a computer is commonly utilized to generate the computer program required to machine cabinet components from sheet material. The software program generally performs the task of efficiently positioning or nesting the individual components on each sheet of material in the most efficient manner. The accepted method is to design all the cabinets for a particular application, a kitchen for example, and then cut all the parts for all the cabinets as a single job. This job may require multiple sheets of material, each with various parts nested on it. In general, the larger the number of parts nested as a single job, the more efficiently the computer program can position the parts to minimize scrap.

In this positioning effort, the software generally only considers the size and shape of each part, and does not consider the cabinets in the job for which the part is used. As a result, parts for various cabinets are intermingled in the resulting programmed nest. Generally, the design software program will provide a method to print diagrams identifying the individual parts on each sheet of material and will likewise provide a method to print an identifying label for each individual part. Generally, using the printed nest diagrams the appropriate label is placed on each part after machining but before removing them from the nest. It is then necessary to sort these parts into components for each cabinet based on information provided on the label.

Once sorted into individual cabinets, it is necessary to assemble the individual components into the final cabinet case. This can be a difficult and confusing process, especially when assembling more complex cases with internal shelves and partitions.

Generally, an assembly drawing must be created and provided, referring to each of the individual components and their relationship to one another. If a specific sequence for assembling components for a particular case design is required, this information must also be provided.

Using the information provided, the person assembling the cabinet must develop a mental understanding of the assembly process and sequence and must locate and identify each of the parts based on information provided on the part label. This requires substantial time and mental effort, and materially reduced productivity.

A common method of joining cabinet parts together uses a machined joint that has become known as a "blind dado". In this approach, a tab, commonly referred to as a tenon, fits into a slot, commonly referred to as a dado. Because the joinery stops short of the edges of the parts and is not visible when assembled, it is referred to as a "blind dado" joint. This joint allows the two mating components to be assembled in two orientations, the correct orientation with the tenon on the bottom as shown, or an incorrect orientation with the top part flipped over and the tenon on top. While the correct orientation is apparent for a corner joint, it may not be apparent for internal joints such as shelves or partitions. This often results in cabinets being assembled incorrectly.

Accordingly, it is the principal object of the present invention to provide an improved method of assembling a number of workpieces provided with mating sets of mortises and tenons, to form a structure such as a cabinet and the like, and to provide a structure made by such method. Another object of the invention is to provide such a method in which the proper orientation of a particular workpiece to be joined to another workpiece by means of a mating mortise and tenon connection, is facilitated. A still further object of the invention is to provide a method of indicating a proper sequence of assembly of a number of workpieces configured to be joined together by mating mortise and tenon connections.

SUMMARY OF THE INVENTION

The principal object of the present invention is achieved by a method of forming an assembly consisting of a first workpiece having a surface provided with a mortise and a second workpiece provided with a tenon inserted into such mortise in joining such workpieces together, in which the second workpiece is disposed in a certain orientation relative to the first workpiece, to provide a certain disposition of such workpieces when joined together, comprising providing identifying marks on the surface of the first workpiece providing the mortise and on the tenon of the second workpiece, at locations thereat assuming a certain disposition when the second workpiece is disposed in the certain orientation relative to the first workpiece and the tenon is registered with the mortise; positioning the second workpiece relative to the first workpiece wherein the second workpiece is disposed in the certain orientation relative to the first workpiece, the tenon is registered with the mortise and the marks are disposed in the certain mark disposition; and displacing the second workpiece toward the first workpiece and inserting the tenon in the mortise.

In another embodiment of the invention the markings on adjoining workpieces may in an integrated or separate manner indicate the order of sequence of the connection of pairs of workpieces in assembling a particular structure.

BRIEF DESCRIPTION OF THE DRAWINGS

FIG. 3 is a perspective view of a drawer of the cabinet shown in FIG. 1, illustrated in partially exploded relation;

FIG. 4 is a view similar to the view shown in FIG. 3, illustrating the drawer in fully exploded relation; and FIG. 5 is a perspective view of a pair of workpieces provided with components of a blind dado joint, illustrated in exploded relation, embodying the present invention.

DETAILED DESCRIPTION OF THE INVENTION

Figure 1:
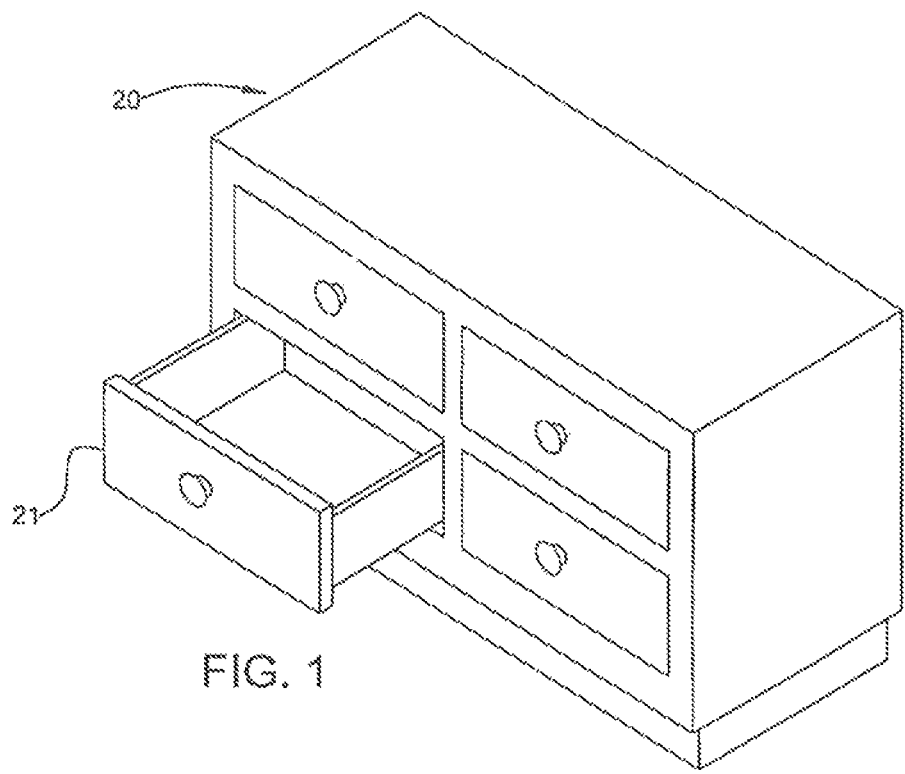
FIG. 1 is a perspective view of a cabinet assembled in accordance with the method of the present invention.
Figure 2:
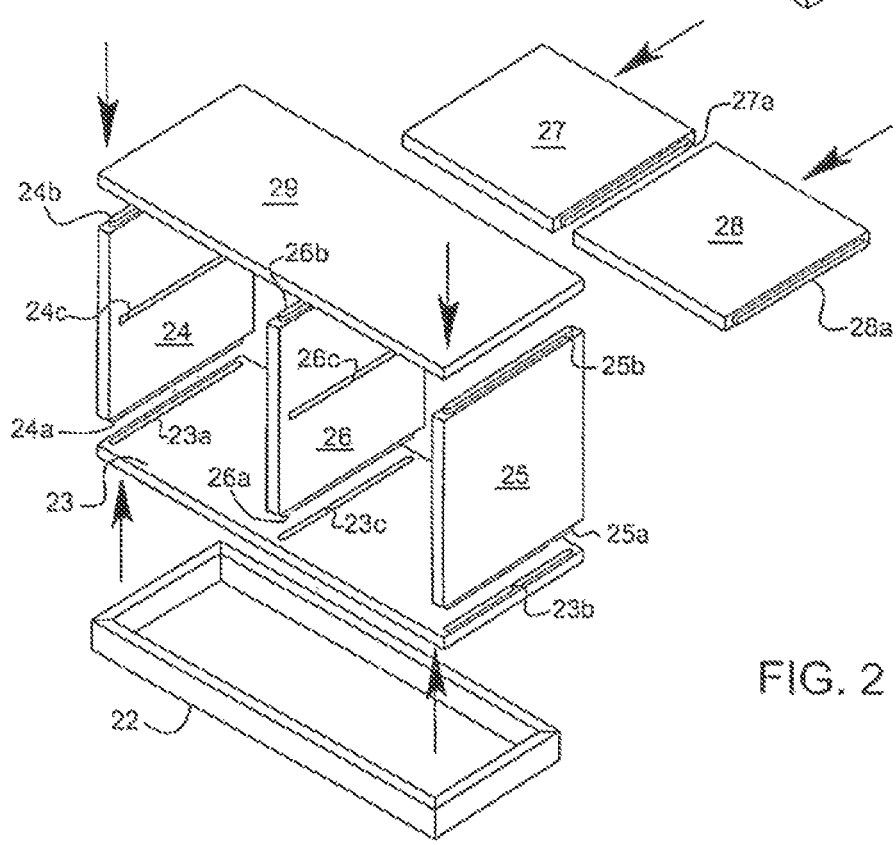
FIG. 2 is a perspective view of the base portion of the cabinet shown in FIG. 2, illustrated in exploded relation.

Referring to FIG. 1 of the drawings, there is illustrated a cabinet 20 provided with a set of drawers 21, assembled with the component workpieces shown in FIGS. 2 through 4, in accordance with the present invention. As shown in FIG. 2, the component pieces of the cabinet include a rectangular base 22, a bottom panel 23, a pair of side panels 24 and 25, a partition panel 26, a pair of shelf panels 27 and 28 and a top panel 29. As shown in FIGS. 3 and 4, each drawer 21 is comprised of a bottom panel 30, a rear panel 31, a pair of side panels 32 and 33 and a front panel 34.

The component panels as described are secured together by means of a mortise formed in one piece and either a side edge or tenon of an adjoining piece being received in such mortise and secured by gluing. With respect to the cabinet, bottom panel 23 is provided mortises 23a and 23b adjacent the side edges thereof, and a center mortise 23c. Side panel 24 is provided with a lower edge tenon 24a insertable in mortise 23a, an upper edge tenon 24b and a mortise 24c disposed on an inner surface thereof. Similarly, side panel 25 includes a lower edge tenon 25a insertable in mortise 23b, an upper edge tenon 25b and a mortise 25c (hidden) on an inner surface thereof. Partition panel 26 is similar to the side panels, including a lower edge tenon 26a insertable in mortise 23c, an upper edge mortise 26b and mortises 26c and 26d (hidden) on the side surfaces thereof. The underside of upper panel 29 is provided with mortises 29a, 29b, and 29c (all hidden) which receive tenons 24b, 26b and 25b, respectively. Shelf panel 27 is provided with side edge tenons 27a and 27b (hidden) which are received in mortises 26d and 24c, and shelf panel 28 similarly is provided with side edge tenons 28a and 28b (hidden) which are received in mortises 25c and 26c, respectively.

Rear panel 31 of each drawer is provided with a mortise 31a along a lower edge thereof which receives a rear edge of the bottom panel 30, and side edge tenons 31b and 31c. Side panel 32 includes a mortise 32a in the inner side thereof, along a lower edge, adapted to receive a side edge of panel 30, a mortise 32b on the inner side thereof, along a rear edge thereof, adapted to receive tenon 31b and a side edge tenon 32c. Similarly, side panel 33 includes a mortise 33a (hidden) on an inner side thereof along a lower edge, adapted to receive a side edge of panel 30, a mortise 33b (hidden) on the inner side thereof, along a rear edge thereof, adapted to receive tenon 31c, and a side edge tenon 33c. Front panel 34 is provided with mortises 34a, 34b and 34c in a back surface thereof along lower and side edges thereof which are adapted to receive the front edge of bottom panel 30 and tenons 32c and 33c, respectively.

The described structure is intended to be formed by first machining the component pieces to their appropriate configurations and then manually fitting such machined components together with panel side edges and tenons inserted in mating mortises. The various pieces are formed by placing one or more sheets of material on the worktable of a CNC router programmed to cut the profiles of the individual pieces, and further form the various mortises and tenons in such cut pieces. Typically, the programs for operating such routers provide for not only cutting the profiles of such pieces and forming the various mortises and tenons but provide for the most efficient cutting pattern to maximize the yield of each such sheet of material. They further would provide for the proper orientation of panels on the machine table in order to cut mortises in upwardly facing panels and providing for undercuts of tenons offset from the middle of a side edge of a panel.

Following the machining of the panels, such panels are manually fitted and glued together by suitably mating panel edges and tenons with mating mortises. Such procedure requires an assembler to locate mating panels and fit them together in a sequence to provide an efficient assembly of the components.

Invariably, there is a prescribed or logical sequence for mating and fitting the various components together to form a structure. Accordingly, to facilitate such a sequence, the programs used to form the panels are written in a manner so as to mark each set of mating edges or tenons and mortises with indicia indicating the order of sequence of such mating and fitting together of components. As shown in FIG. 5, such indicia may consist of machine formed notches 40 provided on the tenon 41 of a workpiece 42, and matching notches 43 provided on a surface 44 of a mating workpiece 45 at an edge of a mortise 46 formed in such surface. Such indicia not only identify mating edges or tenons and mortises but indicate the order of sequence of such mating. As an example of the use of such a procedure in assembling the components to form cabinet 20 in accordance with a prescribed sequence involving the sequential fitting of the several panels together, tenon 24a and mating mortise 23a each would be provided with a single notch, tenon 26a and mating mortise 23c each would be provided with two notches, tenon 27b and mating mortise 24c each would be provided with three notches and so on with respect to the remaining tenons and mortises. With such an arrangement, an assembler need only match each tenon or panel edge with a mating mortise, and fit them together in the order of sequence indicated by the number of notches on the mating components.

As previously indicated, it is contemplated that the various components of the structure to be formed, be produced from one or more sheets of material placed on the worktable of a CNC router equipped with appropriate cutting tools and operated with a suitably written program. Such program would be written to provide for suitably orienting the components on the sheet to maximize the usage of the sheet in providing such components with a minimal amount of scrap, orienting components to be provided with mortises with the surfaces to receive such mortises facing upwardly, cutting the profiles of such components, machining the tenons and mortises in such components and machining notches in mating edges or tenons and mortises to indicate the order of mating and fitting as described.

In circumstances where a tenon is offset from a centrally disposed plane of a workpiece, and it is required that such workpiece be mated or fitted with an adjoining workpiece in a particular orientation relative to such adjoining workpiece, the proper orientation of such first workpiece relative to such a second workpiece is effected by providing matching indicia in the form of machined notches on the tendon of the first workpiece and on the surface provided with the mortise of the second workpiece. Such notches may be provided either on the same side or on opposite sides of a plane intersecting the side surfaces of the tenon and mortise of mating workpieces when the first workpiece is properly oriented relative to the second workpiece and the tenon of the first workpiece is registered with the mortise of the second workpiece.

With such an arrangement, an assembler would be able to discern the proper orientation of a first workpiece having an offset tenon with the mortise of a mating workpiece by assuring that the markings are either on the same or opposite sides of the mating component, as instructed.

The markings utilized to indicate the order of sequence of interfitting the various workpieces also may be utilized to determine the orientation of a workpiece with an offset tenon with a mating workpiece. As an example, if the order of sequence of two workpieces is three, the tenon of a first workpiece having an offset tenon would be provided with three notches in a side of a plane intersecting the side surfaces of the tenon of the first workpiece and the mating mortise of the second workpiece when the first workpiece is properly oriented relative to the second workpiece, and the surface of the mating mortise would be provided with matching three notches on the same side of such plane, as shown in FIG. 5.

The method as described provides not only for assembling the components of a structure in an orderly sequence but assuring the proper orientation of adjoining components where tenons of such adjoining components may be offset.

With the matching notches being formed on the surface in which a mortise is provided, adjacent the mortise, of a first workpiece, and on the tenon of the mating workpiece which is inserted into such mortise when the workpieces are fitted together and secured by gluing, such notches would not be visible in the finished product.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of fabricating a plurality of component panels configured to be assembled together to define a structure, the method comprising:
    fabricating a first set of component panels of the plurality of component panels, wherein the first set of component panels includes a first component panel having a first mortise and a second component panel having a first tenon configured to be received in the first mortise; and
    fabricating a second set of component panels of the plurality of component panels, wherein the second set of component panels includes a third component panel having a second mortise and a fourth component panel having a second tenon configured to be received in the second mortise,
    wherein fabricating the first set of component panels includes providing each of the first and second component panels with respective first indicia, the first indicia including one of a projection and a notch,
    wherein fabricating the second set of component panels includes providing each of the third and fourth component panels with respective second indicia, and
    wherein the first and second indicia are configured to communicate to an assembler that the first set of component panels are to be assembled to one other before the second set of component panels.

2. The method of claim 1, wherein the first indicia is different from the second indicia.

3. The method of claim 1, wherein each component panel of the plurality of component panels is cut from a single sheet of material.

4. The method of claim 1, wherein fabricating the first and second sets of component panels includes operating a CNC router programmed to cut the first, second, third, and fourth component panels.

5. The method of claim 4, wherein the first, second, third, and fourth component panels are cut from a single sheet of material.

6. The method of claim 1, wherein the first and second indicia include markings.

7. The method of claim 1, wherein a notch is disposed on the first component panel and a projection is disposed on the second component panel.

8. The method of claim 7, wherein the notch is disposed in the first mortise and the projection is disposed on the first tenon.

9. The method of claim 7, wherein the notch is configured to receive the projection.

10. The method of claim 1, wherein the projection includes a plurality of projections, and the notch includes a plurality of notches.

11. The method of claim 1, further comprising the steps of:
    inserting the first tenon into the first mortise; and
    inserting the second tenon into the second mortise.

12. The method of claim 11, wherein the second tenon is inserted into the second mortise after the first tenon is inserted into the first mortise.

13. A method of fabricating a plurality of component panels configured to be assembled together to define a structure, the method comprising:
    programming a CNC router to fabricate first and second sets of component panels of the plurality of component panels from one or more sheets of material;
    operating the CNC router to fabricate the first set of component panels, wherein the first set of component panels includes a first component panel having a first mortise and a second component panel having a first tenon configured to be received in the first mortise, wherein the first mortise and first tenon include corresponding first markings wherein the first markings include one of a projection and a notch; and
    operating the CNC router to fabricate a second set of component panels, wherein the second set of component panels includes a third component panel having a second mortise and a fourth component panel having second tenon configured to be received in the second mortise, wherein the second mortise and second tenon include corresponding second markings,
    wherein the first and second markings are configured to communicate to an assembler that the first set of component panels are to be assembled to one other before the second set of component panels.

14. The method of claim 13, further comprising the steps of:
    inserting the first tenon into the first mortise; and
    inserting the second tenon into the second mortise.

15. The method of claim 14, wherein the second tenon is inserted into the second mortise after the first tenon is inserted into the first mortise.

16. A method of fabricating a plurality of component panels configured to be assembled together to define a structure, the method comprising:

fabricating the plurality of component panels, wherein the plurality of component panels includes a first component panel, a second component panel configured to be secured to the first component panel at a first mortise-tenon joint, and a third component panel configured to be secured to the first component and at a second mortise-tenon joint, wherein each mortise and tenon of the first mortise-tenon joint includes respective first indicia, wherein the first indicia includes one of a projection and a notch, wherein each mortise and tenon of the second mortise-tenon joint includes respective second indicia, and wherein the first and second indicia are configured to communicate to an assembler that the second component panel is to be assembled to the first component panel before the third component panel is assembled to the first component panel.

17. The method of claim 16, wherein fabricating the plurality of component panels includes operating a CNC router programmed to cut the first, second, and third component panels.

18. The method of claim 16, wherein the first indicia is different from the second indicia.

* * * * *